United States Patent [19]

Boxer

[11] 4,347,467
[45] Aug. 31, 1982

[54] CONTROL CIRCUIT FOR A D.C. MOTOR

[75] Inventor: Trevor C. Boxer, Birmingham, England

[73] Assignee: Lucas Industries Limited, Birmingham, England

[21] Appl. No.: 224,222

[22] PCT Filed: Dec. 4, 1978

[86] PCT No.: PCT/GB78/00047
§ 371 Date: Jul. 23, 1979
§ 102(e) Date: Jul. 23, 1979

[87] PCT Pub. No.: WO79/00441
PCT Pub. Date: Jul. 12, 1979

[30] Foreign Application Priority Data

Dec. 8, 1977 [GB] United Kingdom ............... 51066/77

[51] Int. Cl.³ ............................................. H02P 5/16
[52] U.S. Cl. ..................................... 318/317; 318/341
[58] Field of Search ..................... 318/317, 391, 345 R

[56] References Cited

U.S. PATENT DOCUMENTS

| | | | |
|---|---|---|---|
| 3,597,671 | 8/1971 | Adams et al. | 318/341 X |
| 3,883,786 | 5/1975 | McNaughton et al. | 318/317 |
| 3,944,900 | 3/1976 | Rohsler | 318/317 |
| 4,162,436 | 7/1979 | Waldorf et al. | 318/341 X |
| 4,196,377 | 4/1980 | Boxer | 318/269 |
| 4,211,961 | 7/1980 | Marumoto et al. | 318/341 X |
| 4,211,965 | 7/1980 | Toyama et al. | 318/341 |
| 4,217,527 | 8/1980 | Bourke et al. | 318/341 X |

FOREIGN PATENT DOCUMENTS

| | | | |
|---|---|---|---|
| 2519855 | 4/1976 | Fed. Rep. of Germany | 318/317 |
| 2013745 | 4/1970 | France | |
| 2125070 | 9/1972 | France | |
| 2232863 | 1/1975 | France | |

Primary Examiner—J. V. Truhe
Assistant Examiner—Richard M. Moose
Attorney, Agent, or Firm—Ladas & Parry

[57] ABSTRACT

A motor control circuit includes a chopper circuit (11) including a main switching element (14) which is connected in series with the motor armature (12). The chopper is controlled by a Schmitt bistable circuit (34) which operates to switch the main switching element on when the actual motor current falls more than a set amount below a demanded level and off when the actual motor current rises more than a set amount above the demanded level, the demand level is determined by the driver's pedal controlled potentiometers (37, 38) but is required to be modified in accordance with the motor speed. Instead of using a mechanical speed transducer, the present invention includes a circuit (40) which is connected to the output of the bistable circuit (34) and produces a signal varying in accordance with the ratio of the on and off times of the main switching element.

4 Claims, 6 Drawing Figures

CONTROL CIRCUIT FOR A D.C. MOTOR

TECHNICAL FIELD

This invention relates to a control circuit for a d.c. motor.

BACKGROUND ART

Known circuits have often included means sensitive to the speed of the motor in the form of a transducer mechanically driven by the motor (or by the vehicle transmission). Generally speaking the transducer produces an a.c. signal which varies in frequency with the speed of the motor. Such a transducer is, however, considered to be an undesirably expensive component of the control system and it is an object of the invention to provide a control system of the general kind referred to in which no mechanical speed transducer is utilized.

DISCLOSURE OF INVENTION

In accordance with the present invention a d.c. motor control circuit includes a chopper circuit with a main switch element arranged to be turned on or off to control the supply of power to the motor and speed sensitive means including means sensitive to the ratio of the on and off times of the main switch element of the chopper circuit.

The invention is particularly, but not exclusively, applicable to control circuits of the known kind in which there is a motor current demand signal generator which generates a demand signal, a feedback circuit for producing a feedback signal corresponding to the actual motor current and means for switching the main switch element on when the feedback signal falls more than a set amount below the demand signal and for switching the main switch element off when the feedback signal rises more than a set amount above the demand signal. In such a circuit the speed sensitive means may provide an input to the demand signal generator to vary the demand signal independently of a demand input to the demand signal generator from a driver's accelerator pedal device or the like.

Where the motor is of the type having separate armature and field windings, it is known to provide a separate chopper circuit for the field winding, so as to enable the field current to be reduced when the vehicle speed reaches a level that the armature back e.m.f. becomes such that the demanded armature current cannot be achieved. In such a system the signal which is generated to control the reduction of field current may also be employed as a signal which is indicative of speed.

BRIEF DESCRIPTION OF DRAWINGS

An example of the invention is shown diagrammatically in the accompanying drawings in which.

BEST MODE FOR CARRYING OUT THE INVENTION

Figure 1:
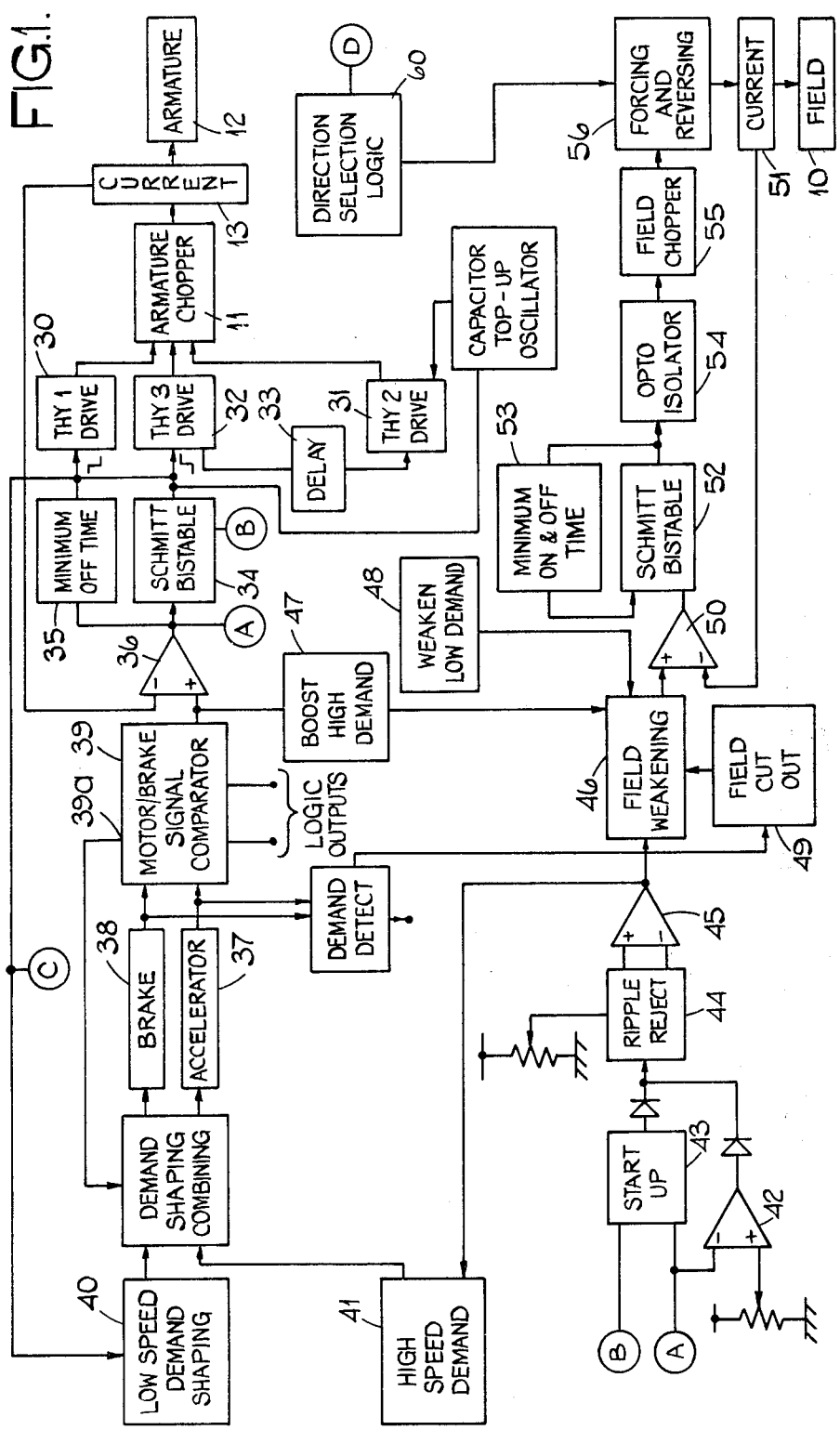
FIG. 1 is a block diagram of the control system.

Referring firstly to FIG. 1 the system, which is for the control of a d.c. traction motor, with separately excited field winding 10, makes use of an armature current chopper circuit 11 which controls the current flowing in the motor armature 12. A Hall-effect current sensing circuit 13 is used to produce a feedback signal corresponding to the actual current flowing in the armature.

Figure 2:
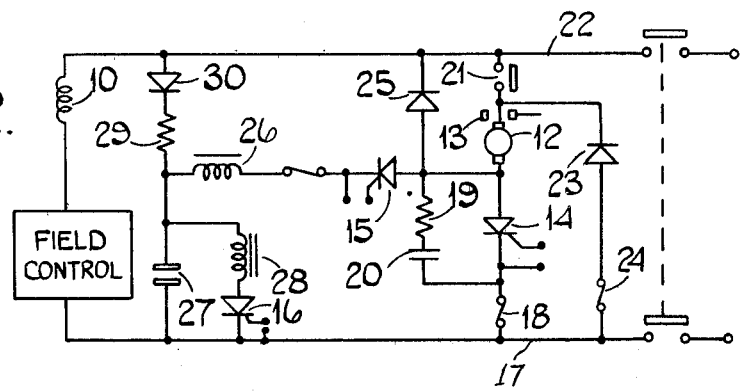
FIG. 2 is a circuit diagram of an armature chopper circuit included in FIG. 1.

As shown in FIG. 2 the chopper circuit 11 includes a main thyristor 14, a commutating thyristor 15 and a third thyristor 16. The thyristor 14 connects one terminal of the motor armature 12 to a negative supply rail 17 via a main fuse 18, the anode-cathode of the thyristor 14 being shunted by a resistor 19 and a capacitor 20. The other terminal of the armature 12 is connected via a contact 21 to a positive supply rail 22. This other terminal of the armature 12 is also connected by a diode 23 and fuse 24 in series to the rail 17 to provide a current path for armature current during braking i.e. when the contact 21 is open. A recirculation diode 25 connects the first-mentioned armature terminal to the rail 22 to provide a current recirculation path to carry continuing (but decaying) armature current when the thyristor 14 is not conducting.

The thyristor 15 has its anode connected to the anode of the main thyristor 14 and its cathode connected via an inductor 26 to one side of a commutating capacitor 27 the other side of which is connected to the rail 17. The third thyristor 16 has its cathode connected to the rail 17 and its anode connected via a further inductor 28 to said one side of the capacitor 27.

The armature current chopper circuit operates as follows: When increased current flow is required in the armature, the main thyristor 14 is fired. When reduced current is required, the thyristor 16 is fired and then, after a fixed delay, the thyristor 15 is fired. Before the thyristor 16 is fired, said one side of the capacitor 27 is at a positive voltage relative to the rail 17. On firing of the thyristor 16 the capacitor 27 discharges through the inductor 28 and when it is fully discharged current continues to flow in inductor 28, reversing the voltage on capacitor 27. The thyristor 16 automatically turns off when the capacitor 27 is fully reverse charged. The delay before firing of the thyristor 15 is arranged to be long enough to ensure that the thyristor 16 has switched off. When thyristor 15 is fired, since the capacitor is reverse charged armature current will flow through the inductor 26 into the capacitor 27, diverting all current from the thyristor 14 and thereby allowing this to turn off. Current continues to flow into the capacitor 27 until this is fully charged whereupon thyristor 15 turns off, armature current then being diverted through the diode 25.

FIG. 2 also shows a diode 30 and resistor 29 in series between the rail 22 and said one side of the capacitor 27. These components serve to maintain the positive voltage on the capacitor 27 should the main thyristor 14 remain on for a long period.

Returning now to FIG. 1, it will be seen that there are three drive circuits 30, 31 and 32 which are respectively associated with the thyristors 14, 15 and 16 depicted in FIG. 2. These circuits are described in detail in British Patent Application No. 45459/76 together with a delay circuit 33 which triggers the drive circuit 31 a predetermined time interval after circuit 32 has been triggered.

The drive circuits 30 and 32 are triggered by falling and rising edges respectively of the output signal of a Schmitt bistable circuit 34 with a minimum "off time" feedback circuit 35, also described in application no. 45459/76.

The input to the Schmitt bistable circuit 34 is from a differential amplifier 36 which is connected to compare a voltage signal representing the demanded armature current and a voltage signal from the current transducer circuit 13. The amplifier 36 produces an output proportional to the difference between these voltage signals.

The armature current demand signal is produced in a demand signal generating circuit which includes two pedal-actuated potentiometers 37 and 38, operated by the driver's accelerator and brake pedals respectively. The signals from sliders of these potentiometers are applied to a motor/brake comparator circuit 39 which compares the two signals and connects that which has the greater magnitude to be applied to the amplifier 36. The circuit 39 also provides a number of logic outputs which are used in a logic circuit (not described herein) controlling various contactors which determine the mode of connection of the field winding and the armature winding that provide the forward and reverse motoring and braking conditions. One such logic output 39a provides a logic signal which is high when the motoring signal exceeds the braking signal.

Two separate circuits 40 and 41 are used to determine the magnitude of the voltages which are applied to the potentiometers 37 and 38 and which therefore define the maximum demand signal. One such circuit 40 has an input from the output of the Schmitt bistable circuit 34, the mark-space ratio of the output of which is substantially proportional to speed at low speeds (i.e. up to the "base speed" at which the back e.m.f. of the armature is equal to the main battery voltage. The other circuit 41 is controlled by the circuits which cause weakening of the field current above this speed. These circuits include a differential amplifier 42 (operative during braking) which receives an input from the differential amplifier 36 and compares this with a fixed level, a start up circuit 43, which prevents any signals reaching the amplifier 45, unless the output of the Schmitt trigger circuit 34 has been low for more than a predetermined time interval. The greater of the output signals from the amplifier 42 and the circuit 43 is applied, via a ripple rejection circuit 44 to a further differential amplifier 45 which produces the signal controlling circuit 41 and also controlling a field weakening circuit 46. For the purposes of the present description no mention need be made of other control circuits 47, 48, 49 which are associated with the circuit 46 and act to boost weaken, or totally remove the field current demand signal produced by circuit 46, such circuits being described in detail in the aforesaid application no. 45459/76. The output of the circuit 46 is applied to one input of a differential amplifier circuit 50 which compares it with a voltage signal from a field current transducer 51. The output of amplifier 50 is applied to another Schmitt bistable circuit 52 which has a minimum on-and-off time feedback circuit 53. The output of the circuit 52 is applied via an opto-isolator circuit 54 to the field current chopper circuit 55 which supplies current to the field winding 10 via a so-called forcing and reversing circuit 56 which controls the mode of connection of the field winding.

Figure 3:
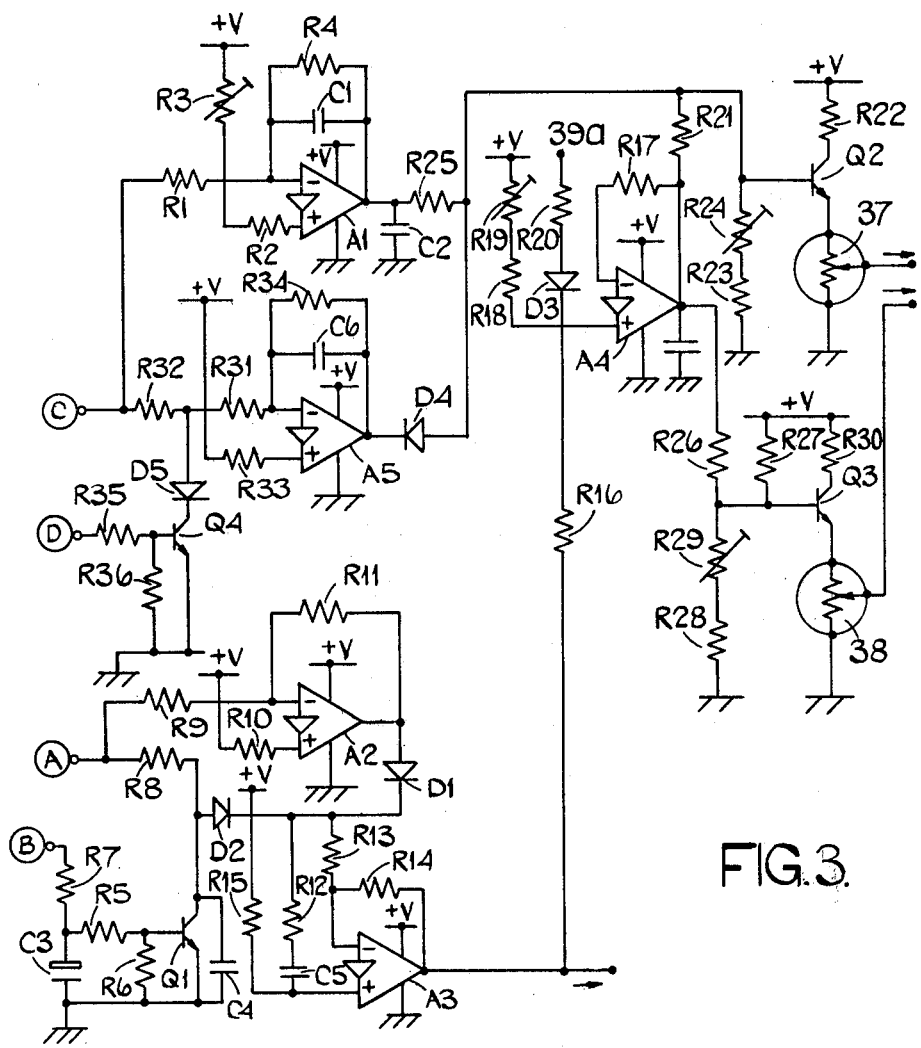
FIG. 3 is a circuit diagram of a part of the control system of FIG. 1.

Turning now to FIG. 3, it will be seen that the low speed demand shaping circuit 40 includes an operational amplifier $A_1$ which is of the current differencing type (e.g. a National Semiconductors LM 3900 integrated circuit operational amplifier). The amplifier $A_1$ has its inverting input terminal connected via a resistor $R_1$ to the output terminal of the Schmitt trigger circuit 34 and its non-inverting input terminal connected via a resistor $R_2$ and a variable resistor $R_3$ in series to a positive supply rail +V. Feedback around the amplifier $A_1$ is provided by a resistor $R_4$ and a capacitor $C_1$ in parallel and the output terminal of the amplifier $A_1$ is grounded by a capacitor $C_2$. The output voltage of the amplifier $A_1$ is thus linearly related to the mark-space ratio of the output of the Schmitt bistable circuit 34. At very low speeds, when the mark-space ratio is small, the output of the amplifier will be at a maximum, but at a mark-space ratio determined by the setting of resistor $R_3$ the output will start to fall linearly and eventually reaches zero when the output of the Schmitt bistable circuit 34 is continuously high (i.e. at the "base" speed referred to above).

The "start-up" circuit 43 of FIG. 1 is represented in FIG. 3 by the circuit surrounding the transistor $Q_1$. This npn transistor has its emitter grounded and its base connected to the common point of two resistors $R_5$ and $R_6$ connected in series with a third resistor $R_7$ between the ground rail and input terminal B (which is the output of the Schmitt bistable circuit 34). A capacitor $C_3$ is connected between the junction of the resistors $R_5$ and $R_7$ and the ground rail and the resistor $R_7$ and capacitor $C_3$ from, in combination, a delay circuit which prevents the transistor $Q_1$ from turning on unless the output of the Schmitt bistable circuit has been low for more than a predetermined length of time. The collector of the transistor $Q_1$ is connected via a resistor $R_8$ to the terminal A which is at the output of the amplifier 42 and a further capacitor $C_4$ connects the collector of the transistor $Q_1$ to ground.

The differential amplifier circuit 42 of FIG. 1 is represented by the circuit surrounding the amplifier $A_2$ in FIG. 3. This amplifier $A_2$ (which is again a current differencing integrated circuit operational amplifier, as are all the amplifiers shown in FIG. 3), has its inverting input terminal connected via a resistor $R_9$ to the terminal A and its non-inverting input terminal connected by a resistor $R_{10}$ to the +V rail. A feedback resistor $R_{11}$ connects the output and inverting input terminals so that the output of amplifier $A_2$ falls linearly with increasing input to terminal A.

The ripple rejection circuit of FIG. 1 is represented in FIG. 3 by a resistor $R_{12}$ and capacitor $C_5$ connected in series between the cathode of a diode $D_1$, with its anode connected to the output of the amplifier $A_2$, and the noninverting input terminal of an amplifier $A_3$ representing the amplifier circuit 45 of FIG. 1. A further diode $D_2$ has its cathode connected to the cathode of the diode $D_1$ and its anode connected to the collector of the transistor $Q_1$. The cathodes of the diodes $D_1$, $D_2$ are connected by a resistor $R_{13}$ to the inverting input terminal of the amplifier $A_3$ which has a feedback resistor $R_{14}$ between its output terminal and its inverting input terminal. A resistor $R_{15}$ connects the non-inverting input terminal of the amplifier $A_3$ to the +V supply rail.

During motoring, at below "base" speed, the transistor $Q_1$, will be on so that no signal can pass from terminal A to the inverting input terminal of amplifier $A_3$. At base speed and above, the transistor $Q_1$ remains off and the current applied to the inverting input terminal of amplifier $A_3$ exceeds the bias current to the non-inverting input terminal so that the output of amplifier $A_3$, falls linearly with rising voltage at terminal A.

The output of amplifier $A_3$ is connected by a resistor $R_{16}$ to the non-inverting input terminal of an amplifier $A_4$ which has a feedback resistor $R_{17}$ connected between its output terminal and its inverting input terminal. The non-inverting input terminal of amplifier $A_4$ is also connected via a resistor $R_{18}$ and a variable resistor $R_{19}$ in series to the $+V$ supply rail and the terminal 39a is connected via a resistor $R_{20}$ and a diode $D_3$ in series to the non-inverting input terminal.

The output terminal of the amplifier $A_4$ is connected by a resistor $R_{21}$ to the base of an npn transistor $Q_2$ which has the accelerator pedal potentiometer 37 connected between its emitter and ground a resistor $R_{22}$ is connected between the collector of the transistor $Q_2$ and the $+V$ rail, and a resistor $R_{23}$ and a variable resistor $R_{24}$ in series are connected between the base of transistor $Q_2$ and the ground rail. A resistor $R_{25}$ connects the output terminal of the amplifier $A_1$ to the base of the transistor $Q_2$.

Similarly, for the brake pedal potentiometer 38, there is another npn transistor $Q_3$, the potentiometer 38 being connected between the emitter of this transistor $Q_3$ and the ground rail. The base of the transistor $Q_3$ is connected to the output terminal of amplifier $A_4$ by a resistor $R_{26}$, to the $+V$ rail by a resistor $R_{27}$ and to the ground rail by a resistor $R_{28}$ and a variable resistor $R_{29}$ in series.

Figure 4:
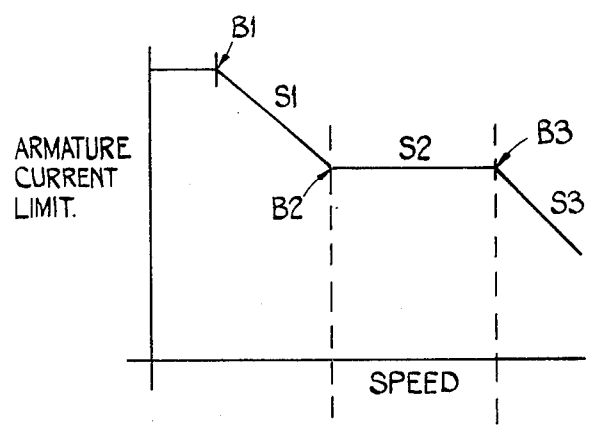
FIGS. 4 to 6 are graphs showing the speed/maximum armature current characteristics of the control for forward motoring, braking and reverse motoring modes respectively.
Figure 5:
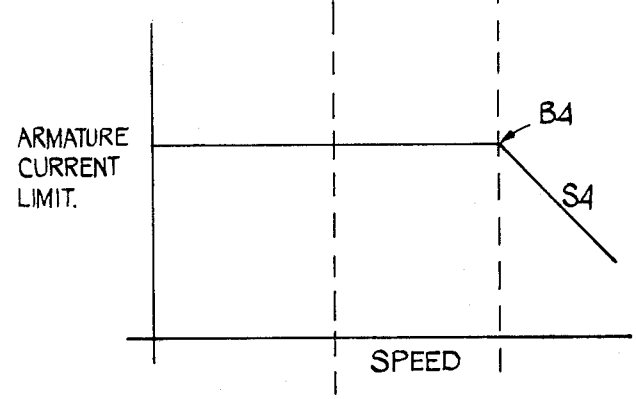

The circuit described thus far operates as follows: In forward motoring, at the lowest end of the speed range the output of amplifiers $A_1$ and $A_4$ are both high so that a maximum demand signal range is available. As speed increases the average value of the signal at terminal C increases and finally reaches the point where the current flowing into the inverting input of the amplifier $A_1$ exceed that flowing into the non-inverting input and the output begins to fall, thereby reducing the current in resistors $R_{23}$, $R_{24}$ and thus reducing the voltage at the emitter of transistor $Q_2$. Such reduction commences at point $B_1$ in FIG. 4 and the slope $S_1$ of the falling characteristic depends on the gain of the amplifier $A_1$ and the relative values of the resistors $R_{25}$, and $R_{23}+R_{24}$. When the output of the amplifier $A_1$ reaches zero, the voltage at the emitter of transistor $Q_2$ is determined by the resistors $R_{21}$ and $R_{23}+R_{24}$. This occurs at point $B_2$ in FIG. 4.

As speed continues to increase the voltage at the output of amplifier $A_3$ falls until the current flowing into the inverting input terminal of the amplifier $A_4$ is greater than that flowing into the non-inverting input thereof, whereupon the output of amplifier $A_4$ starts to fall. This occurs at the point $B_3$ in FIG. 4, the slope $S_2$ for speeds above this point being determined by the gains of amplifiers $A_3$ and $A_4$ and the relative values of the resistors $R_{21}$ and $R_{23}+R_{24}$.

In braking mode the signal on the potentiometer 38 is reduced in similar fashion but there is only one breakpoint $B_4$, since amplifier $A_1$ takes no part in the generation of this signal. In braking mode amplifier $A_2$ comes into effect and amplifiers $A_2$ and $A_3$ with their surrounding components determine the break point $B_4$. Since, in braking, the battery voltage may rise to a much higher level than in motoring, less field weakening is required and the break point $B_4$ may therefore occur at much higher speed. To compensate for this, the connection from terminal 39a to the amplifier $A_4$ provides extra bias current during motoring, which is not present during braking.

FIG. 3 also shows a circuit arrangement which limits speed when reverse motoring has been selected. This arrangement includes an amplifier $A_5$, the inverting input terminal of which is connected by two resistors $R_{31}$ and $R_{32}$ in series to the terminal C. A resistor $R_{33}$ connects the non-inverting input terminal of the amplifier $A_3$ to the $+V$ rail and feedback is provided by a resistor $R_{34}$ and capacitor $C_6$ in parallel so that the amplifier operates as an averager like amplifier $A_1$. The output terminal of the amplifier $A_5$ is connected to the cathode of a diode $D_4$, the anode of which is connected to the base of transistor $Q_2$.

To disable the amplifier $A_5$ except during reverse motoring, a transistor $Q_4$ has its emitter grounded and its collector connected via a diode $D_5$ to the common point of the resistor $R_{31}$ and $R_{32}$. The transistor is switched on whenever reverse motoring is not selected by an output D from a direction selection logic circuit 60 (see FIG. 1), the base of transistor $Q_4$ being connected to the common point of two resistors $R_{35}$ and $R_{36}$ connected in series between terminal D and ground.

Figure 6:
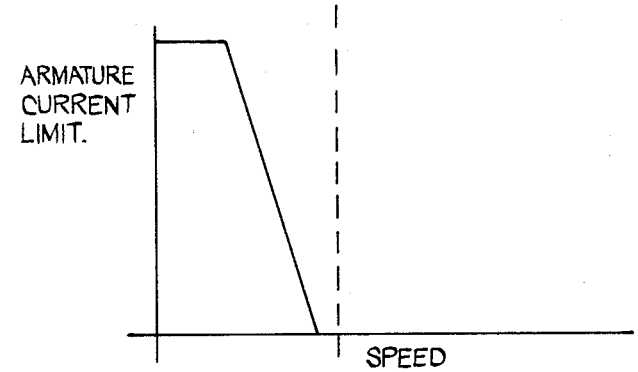

When transistor $Q_4$ is off, i.e. in reverse motoring mode, the output of the amplifier $A_5$ falls steeply for speeds above the required limit (set by the choice of resistor $R_{33}$) as shown in FIG. 6. When transistor $Q_4$ is on, the output of amplifier $A_5$ is high and diode $D_4$ prevents it having any effect on the control.

I claim:

1. A motor control circuit for a DC motor, comprising a chopper circuit with a main switch element arranged to be turned on or off to control the flow of current to the motor armature in accordance with a current demand signal applied to said chopper circuit, a field current control circuit controlling the motor field current independently of the chopper circuit, and speed compensation means for varying the current demand signal automatically to compensate for speed changes, said speed compensation means comprising a circuit responsive only to the ratio of the on and off times of the main switch element.

2. A motor control circuit as claimed in claim 1 further comprising a motor current demand signal generator, a feedback signal generator for generating a feedback signal related to the actual motor current and a control circuit for causing the main switch element to be turned on when the feedback signal falls more than a set amount below the demand signal and for causing the main switch element to be turned off when the feedback signal rises more than a set amount above the demand signal.

3. A motor control circuit as claimed in claim 2 wherein said ratio sensitive circuit is connected to the control circuit which causes the main switch element to be turned on and off.

4. A motor control circuit as claimed in claim 3 wherein the ratio sensitive means is an operational amplifier ($A_1$ or $A_5$) with an input resistor ($R_1$ or $R_{31}$) and a feedback circuit consisting of a resistor ($R_4$ or $R_{34}$) and a capacitor ($C_1$ or $C_6$) in parallel.

* * * * *